Oct. 24, 1950    E. T. HOWES    2,527,096
VOLTAGE PHASE DISPLACEMENT AND
AMPLITUDE INDICATING SYSTEM
Filed Dec. 19, 1945

INVENTOR.
EDGAR T. HOWES
BY
Christie & Angus
ATTORNEYS

Patented Oct. 24, 1950

2,527,096

UNITED STATES PATENT OFFICE 2,527,096

VOLTAGE PHASE DISPLACEMENT AND AMPLITUDE INDICATING SYSTEM

Edgar T. Howes, Pasadena, Calif.

Application December 19, 1945, Serial No. 635,916

10 Claims. (Cl. 172—245)

This invention relates to electrical indicating systems and has for its object to produce on a D. C. type instrument an indication of an alternating voltage amplitude which is selective according to phase displacement from a reference voltage.

Alternating current indicators of the dynamometer type have heretofore been used to produce indications of both the amplitude and the phase of an alternating voltage. Such dynamometer type indicators comprise a stator winding and a rotor winding. A reference alternating voltage is applied to one of the windings and the voltage under measurement is applied to the other winding, causing the rotor to turn through an angular displacement which is dependent on both the amplitude and the phase of the alternating voltage under test. Such a dynamometer type of instrument is described in my co-pending application, Serial No. 551,598, filed August 28, 1944, entitled Stress Measurement, now abandoned.

It is convenient for operational purposes, and also for the purpose of providing an indicator which absorbs only a slight amount of power, to have the indication produced on a direct current type of instrument, such as a galvanometer or milliammeter, instead of on an alternating current dynamometer type of instrument. Direct current instruments have heretofore been used in measuring circuits for indicating alternating current amplitudes; and this has ordinarily been done by rectifying the alternating voltage under test and measuring on a D. C. indicator the amplitude of the rectified current, which will bear some known relation to the alternating voltage producing it. Such devices, however, are not phase-selective in their amplitude indications.

According to my invention, I provide a system which will provide an indication on a D. C. instrument such as a galvanometer or milliammeter which will be responsive to the amplitude of an applied alternating voltage, and will give an amplitude indication dependent on its phase relation with a chosen alternating voltage. I carry out my invention by the provision of a bridge having four arms, two adjacent ones of which comprise a vacuum tube having a cathode, control grid, and anode. I apply to the bridge two alternating voltages of the same frequency, one of which is a reference voltage and the other of which is the voltage under measurement.

I apply one of the alternating voltages in the grid circuit of the tubes; and I apply the other alternating voltage in one of the circuits of the two tubes. Furthermore, I apply half-wave rectification to one of the A. C. voltages and this rectified voltage I apply to the control grids of the tubes. In this way, the control grids acquire a pulsating potential dependent on a half-cycle of the alternating voltage producing it; and the timing of this pulsed potential bears a definite relation in phase to the other alternating voltage. The output circuits of the tubes carry pulsating potentials or currents dependent on the phase relations of the two alternating voltages.

A feature of one possible embodiment of my invention involves applying half-wave rectification to the alternating voltage which is applied to the control grids, and applying the other alternating voltage to the anodes of the two tubes. The relationships are such that pulses of voltage from the half-wave rectifier, proportional to the alternating voltage, are impressed alternately on the control grids; and this in turn varies the anode currents proportionately so that pulses appear in the anode circuits.

In another embodiment of my invention, a feature involves applying one of the alternating voltages directly to the two control grids, and applying half-wave rectification to the other alternating voltage so that a pulsed potential is created in the common return from the two grids to the cathodes of the tubes. This arrangement has the advantage that I may apply D. C. operating voltage to the two anodes so that all of the alternating or pulsing voltages are in the grid circuit where little power is required. A further advantage of this arrangement is that the pulsing voltages in the grid circuits can be made to drive the two grids intermittently greatly negative and beyond cut-off, and produce a desirable square wave effect at the anode circuits.

The indicators according to my present invention are applicable for the general purpose for which dynamometer type instruments have been used and can be used in place of the dynamometer in the arrangements described in my said application Serial No. 551,598, filed August 28, 1944.

My invention will be better understood from the following detailed description and drawings of which:

Figure 1:
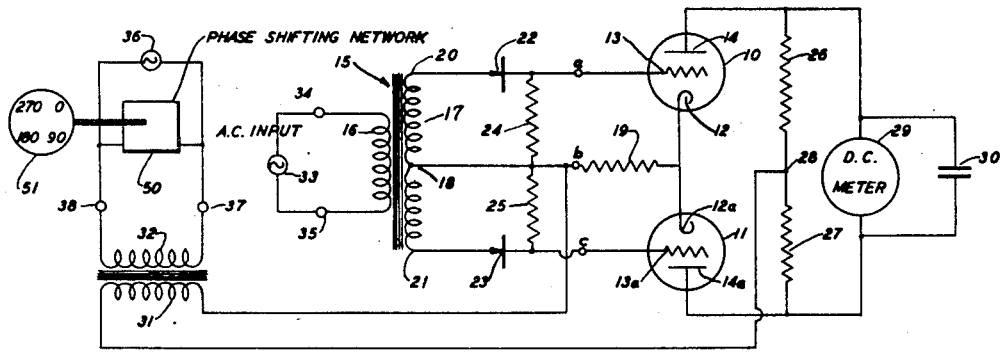
Fig. 1 shows an indicating system according to my invention.

Referring to Fig. 1, the system comprises a pair of vacuum tubes 10 and 11 connected in the bridge relation. The tube 10 comprises a cathode 12, a control grid 13, and an anode 14, and the tube 11 correspondingly comprises a cathode 12a, a grid 13a, and an anode 14a. The two cathodes are tied together and voltages applied to the control grids from an alternating current transformer 15 having a primary coil 16 and a secondary coil 17, provided with a mid-point tap 18 which is connected through a resistor 19 to the cathode. The terminals 20 and 21 of the secondary winding 17 are connected to the respective grids 13 and 13a through respective rectifiers 22 and 23. Grid-leak resistors 24 and 25 connect the respective grids 13 and 13a with the mid-point tap 18.

The anode circuits of the tubes comprise output resistors 26 and 27 connected in series between the two anodes 14 and 14a, and a D. C. indicator 29, such as an ordinary galvanometer of the D. C. type, is connected across the anode. Preferably, a by-passing condenser 30 is connected across the meter to by-pass any alternating current.

There is bridged across the points 18 and 28 the secondary winding 31 of an alternating current transformer, the primary winding 32, of which has impressed on it an alternating voltage of the same frequency as the A. C. voltage to be measured.

A source of alternating current voltage 33 is connected across the input terminal 34 and 35 of the primary winding 16, and another source of alternating voltage 36 is connected across the input terminals 37 and 38 of primary winding 32. The two sources of alternating voltage should have the same frequency, and source 36 preferably acts as a reference voltage, while source 33 is preferably the voltage under measurement. The reference source should have a constant amplitude; and the other source is the one whose amplitude is to be ascertained. If desired, the positions of the reference and test voltages may be reversed; that is, source 33 might be the reference source, and source 36 then would be the source under test.

Assuming source 36 to be the reference voltage, this source is provided with means for shifting its phase through known phase angles, and for this purpose a suitable phase shifting network 50 is shown. This phase shifting network or device may be of any suitable type, of which a number are known; and is shown provided with a scaled dial 51 so that changes in phase angularity may be read on the dial.

It will be recognized that when the alternating voltage from source 33 is applied to the input circuits of tubes 10 and 11, the current in the secondary circuit of transformer 15 will be rectified by rectifiers 22 and 23. This rectified current will flow through resistors 24 and 25, from the respective rectifiers 22 and 23, and back to the mid-tap 18, of winding 17. As each rectifier 22 and 23 is a half-wave rectifier, each rectifier will deliver during one half-cycle of operation, and the pulses of current flowing from the two rectifiers will occur during the opposite halves of the alternating waves in winding 17. In consequence, grid 13 will become negative during one half-cycle and grid 13a will become negative during the opposite half-cycle.

In the absence of any voltage from source 33, the alternating voltage from source 36 is rectified in the cathode-anode circuit of the tubes 10 and 11. During the positive half-cycle, tubes 10 and 11 will be conductive and will allow current to flow through resistors 26 and 27, but during the negative half-cycles the tubes will be blocked. The tubes 10 and 11 as well as resistors 26 and 27 should be chosen identical, so that the resultant potential between anodes 14 and 14a will be zero, and accordingly no reading is had on the D. C. instrument 29. When, however, the voltage from the test source 33 is applied in the grid circuit, the grids are made alternatively negative in an amount proportionate to the amplitude of the source 33, thus causing less current to flow in the anode circuit. If the voltages of the two sources 33 and 36 are in phase, there will be a decrease of plate current in one of the tubes because the grid of that tube will always be going negative during the half cycle that the anode current tends to flow in that tube. Since anode current will continue to flow in the other tube, there will be more current flowing through one of the resistors 26 and 27 than in the other, and there will be a resultant D. C. voltage across the D. C. meter 29 which will be indicated.

Assuming now that the phase of the tested source 33 is varied in relation to that of the reference source 36, additional current will tend to flow in the anode circuit of the tube which was decreased while the two voltages were in phase, and a little less current will tend to flow in the anode circuit of the other tube, because now the grid voltages are somewhat out of phase with the anode voltages. This will manifest itself at the D. C. indicator 29 by a reduction of the indication. The indication will continue to reduce as the two voltages grow more out of phase, until the indication will read zero, when the voltages 33 and 36 are 90° out of phase. Under this condition, there will appear for one-quarter cycle an increase in voltage in one plate and a decrease in the voltage at the other plate, and for the second one-quarter cycle, this condition will reverse itself. The result is that the reversing uni-directional currents between the two anodes are equal and double in frequency to the frequency of the impressed voltage, thus creating a zero resultant uni-directional current through the meter. The D. C. indicator circuit should, of course, be provided with enough inertia so that the indicator will not be following the double frequency wave; and the condenser 30 across the indicator serves for this damping effect.

Rotation of the phase relation of the input source to that at the anode source will create maximum D. C. indication for the in-phase condition and also for a 180° phase difference (but in the opposite polarity) between the voltages, and will create zero indication for phase angularity 90° and 270° apart.

It will be manifest that a calibrated control of the phase of the A. C. voltage source 36, which is the reference source, will allow the indicator 29 to show the phase displacement between the A. C. voltage source 33 under test, and the reference source 36. Furthermore, calibration of the indicator 29 to the voltage source 33 for the in-phase condition will allow subsequent indication of the amplitude of the source 33 being measured. These relationships will be better understood by reference to Fig. 4 described hereinafter.

Figure 2:
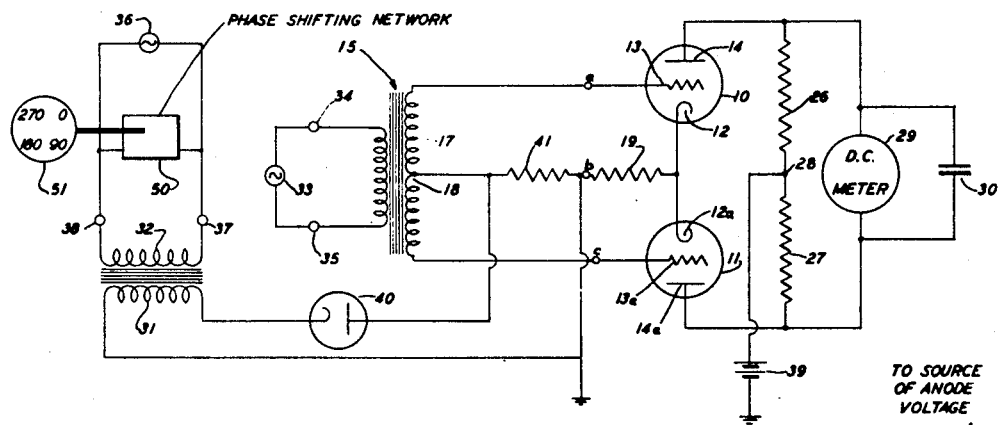
Fig. 2 shows another modification of my invention.

Fig. 2 shows a modification of my invention which has an advantage over the system shown in Fig. 1, in that less A. C. power of the reference source 36 is required than is required in the case of Fig. 1. In Fig. 1, alternating voltage from source 36 is used to create the anode current, thereby requiring substantial power. In the system of Fig. 2, however, the anode current for the tubes is supplied by an ordinary D. C. source 39. The reference alternating voltage source 36, instead of being applied to the anode of the tubes, is rectified in the secondary circuit of winding 31 by a rectifier 40, which may be a diode, and the rectified current is caused to flow through a resistor 41 which is located in the cathode lead between resistor 19 and mid-point 18. As this cathode lead is in the grid circuits of the tubes, the grids 13 and 13a are pulsed to go simultaneously highly negative to cut-off (and preferably far past the cut-off) during opposite half-cycles of the A. C. voltage 36 due to the action of rectifier 40. This causes the anodes of the two tubes to have zero current for each half-cycle of A. C. voltage from source 36. During the non-rectified half cycle of rectifier 40, normal anode current is flowing in the two tubes, as determined by the normal bias created by the cathode resistor 19. This results in the production of a substantially square wave current in the anode circuits of the two bridged tubes. Now, when the alternating voltage from source 33 under test is applied to the grid of tubes 10 and 11, the normal action of applying such an alternating voltage in this bridged tube relation is to make one grid negative while the other is positive.

If the alternating voltages of sources 33 and 36 are in phase, negative and positive voltages on the grids due to source 33 will correspond with the pulses from rectifier 40, also impressed on these grids.

The voltage from source 33 will tend to make one grid more negative at the same time that it is making the other grid more positive. Now if the voltage from source 33 is in the same phase with that from source 36, then during the one-half of the cycle during which the two tubes are carrying anode current, there will be an increase in the anode current for one of the tubes and a decrease in the anode current for the other tube, these increases and decreases being proportional to the magnitude of the impressed A. C. voltage from source 33. This will create a difference in potential between the two anodes during the one half-cycle. Accordingly, the D. C. meter 29 connected between the anodes will indicate this difference of potential.

The D. C. meter can be made to show both the phase and the amplitude of the impressed voltage 33 and will also be significant of the polarity. That this is so will be apparent from the fact that shifting the phase of source 33 under test will produce in the anode circuits of the tubes an orientation of the cycles similar to that described above in connection with Fig. 1.

Figure 3:
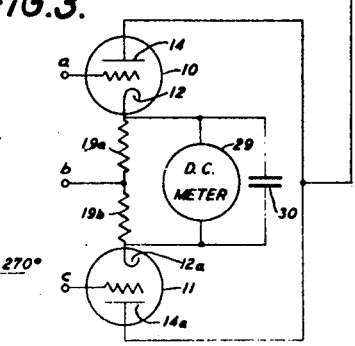
Fig. 3 shows a further modification of my invention.

Fig. 3 illustrates a modification which may be made in the systems of Figs. 1 and 2. In Fig. 3, the D. C. indicator 29, instead of being connected between the two anodes, is connected between the two cathodes 12 and 12a; and the grid biasing resistor instead of being the single resistor 19 in Figs. 1 and 2 is divided into two resistors 19a and 19b in Fig. 3, these two resistors being in series between the cathodes with the common point between them connected to the grid return lead. The points a, b and c in Fig. 3 in the two grid leads and the grid return lead respectively correspond to the same designated points a, b and c in Figs. 1 and 2. The anode circuit in Fig. 3, instead of including the anode resistors 26 and 27, has the two anodes 14 and 14a connected directly together and to the source of anode voltage indicated by the arrow. The anode voltage source may either be the battery 39 of Fig. 2 or the alternating voltage from source 36 in Fig. 1, depending on whether the arrangement of Fig. 3 is to be included in the circuit of Fig. 1 or of Fig. 2.

In the rearrangement of Fig. 3, the indications of the meter result in the same way as in the case of Figs. 1 and 2, and there is no substantial difference in the operation. Meter 29 is bridged between the two cathodes in the anode-cathode circuit of the tubes in a fashion quite similar to the bridging of the meter across the two anodes in Figs. 1 and 2.

The values for the several circuit elements in Figs. 1 and 2 are not especially critical, and are subject to selection over a considerable range for good operating results. However, values which I have found satisfactory are as follows:

| | | |
|---|---|---|
| Resistor 19 | ohms | 400 |
| Resistor 24 | do | 50,000 |
| Resistor 25 | do | 50,000 |
| Resistor 26 | do | 8,000 |
| Resistor 27 | do | 8,000 |
| Resistor 41 | do | 20,000 |
| Condenser 30 | mf | 4 |

Tubes 10 and 11 may be of the 6V6 type, with an anode voltage 39 of 250 volts. Rectifiers 22, 23 and 40 may be of the 6H6 type.

Figure 4:
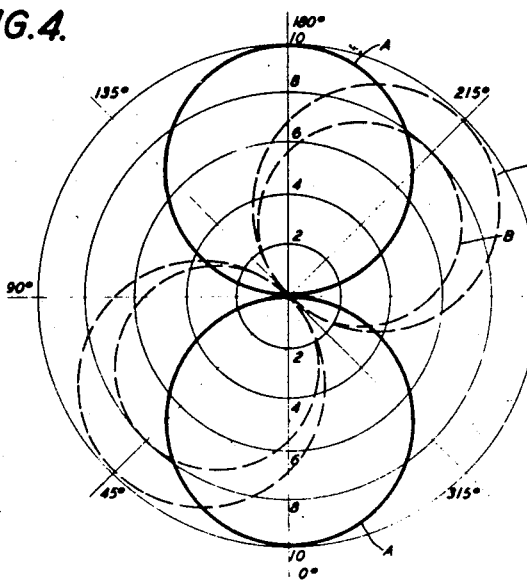
Fig. 4 is a polar coordinate diagram illustrating the operation of my systems.

Fig. 4 illustrates graphically the manner in which my apparatus (either Fig. 1 or Fig. 2 or Fig. 3) operates. Fig. 4 is a polar coordinate diagram in which the angles from 0° to 360° represent the phase displacement of the test source 33 from the phase of the reference source 36. The curve A represents the reading of the D. C. indicator 29 throughout the different angles of phase displacement when the amplitudes of voltage sources 33 and 36 remain constant while their relative phases are being displaced throughout the 360°. It will be seen that at 0° phase displacement, that is, when the two sources 33 and 36 are in phase with each other, the indicator 29 will read a maximum in one direction. Likewise, if the two sources are exactly 180° out of phase, the indicator will also read a maximum, but in the opposite direction; since the currents are going through the anode circuit in the opposite direction. At 90° and 270°, the D. C. indicator reads exactly zero due to the phase cancellation described above. Between these angular values of phase displacement, the indication of the D. C. indicator 29 will vary from its maximum to zero, describing the curve A.

Since the polar coordinate represents amplitudes of indication, it may be assumed for example that the circle of amplitude 10 at the maximum amplitude position represents some arbitrary amplitude value of voltage of source 33 (since the reference source 36 is assumed to remain constant in amplitude). It will be seen that if the phase of source 36 be arbitrarily shifted with respect to that of source 33, the indication of the D. C. meter will change. Thus, if source 36 be 45° displaced from source 33, the reading will be at about 7 instead of 10. This does not mean that the voltage of source 33 has decreased, but merely that it is out of phase with source 36.

To calibrate the system, it will be convenient to select a convenient operating voltage for the reference source 36; and this may be some such value as 25 volts, for example. Once selected, its amplitude will not be changed, although its phase may be arbitrarily shifted by the manual shifting dial 51 of the phase shifting device 50. The system should be arranged so that the greatest unknown voltage 33 to be tested will not drive the meter beyond its maximum deflection. Assume, for example, that this maximum voltage is 10 volts; then 10 volts may be arbitrarily set on source 33 for calibration purposes; and this will produce the maximum indication when the phase shifting dial is turned to bring the two sources 33 and 36 in phase with each other. This will indicate the 0° position or the 180° position on the graph, depending on the polarity of the indication. It will usually be even more convenient to begin the calibration at zero amplitude instead of at maximum amplitude, inasmuch as the zero amplitude reading is more critical. If this procedure be started, the phase of source 36 may be shifted until zero indication is had on meter 29. This means that the phases are either 90° or 270° apart. In this position, the scale of the phase shifting device may accordingly be set at 0° or 90° or 180° or 270°, as the case may be, which will then be a permanent setting for the system and all readings of the phase shifting device will then indicate the phase displacement between sources 33 and 36.

Having thus initiated the calibration, the phase shifting device controlling the phase of the voltage output from source 36 may be moved, for example at 10° intervals throughout the circle, and a meter reading plotted on the chart of Fig. 3 at each angular position, thereby giving the curve A shown in the chart. Every point on curve A will then be the point produced by the arbitrary voltage of source 33, for example, 10 volts at the particular phase angle selected.

Now, if it should happen that source 33 is less than 10 volts, it will not produce on the indicator 29 a reading lying on polar curve A; but instead, the reading will lie somewhere within the curve. Such value of the voltage source 33 under test may be readily ascertained in both its phase relation and its amplitude. Its phase relation may be obtained by rotating the phase shifting control 51 until a maximum indication is had on the indicator 29. The operator will know that this is the in-phase condition between the two sources 33 and 36, and the angular degrees through which it was necessary to shift the phase of the reference voltage from its zero or starting angularity will indicate the relative phase displacement of the test source. The amplitude of the test source will be indicated by the maximum reading on the D. C. meter. For example, if its half-maximum indication should fall on circle of amplitude 8 instead of on circle 10, the operator will know that there are eight volts at source 33 instead of ten volts.

The effect of shifting the reference phase to produce the maximum reading is shown by the dotted polar curve A′ which is the same shaped curve as curve A, but shifted 45°.

This would be the condition, for example, if the test source 33 were of the same voltage as that which made curve A, for example 10 volts, but is 45° displaced from the phase which produced curve A.

Now assume that the phase displacement is 45° as in the case of curve A′, but that the voltage at source 33 instead of being the initial voltage of 10 volts, is now only eight volts. The effect would be that shown by the dotted curve B. This would be the curve for a 45° phase shift but at the reduced amplitude of only eight volts. It would be very easy for the operator to ascertain this voltage and phase displacement because he would simply move his phase shifting device 51 at source 36 until he got a maximum indication on the instrument, which would give his maximum reading on curve B. The phase displacement would be the phase angularity at which he obtained that maximum indication. A more accurate way of obtaining the phase angularity would be to shift the phase shifting device at source 36 to read zero indication which would be at the angular position 135° and 315°.

It will be recognized that by my invention I have provided an effective system for ascertaining the amplitude of an unknown alternating voltage source, and also its phase displacement from a reference source. The advantages of being able to do this on a D. C. indicating type of instrument are manifest. The D. C. type instrument requires less power to operate it that does the A. C. dynamometer type. Furthermore, with the D. C. type meter, higher frequencies may be measured with more accuracy than by the dynamometer type.

I claim:

1. An indicating system for indicating both the phase displacement and the amplitude of an alternating voltage under test, said system comprising a pair of vacuum tubes each having a cathode, a control grid, and anode, connected in bridge relation, a phase variable reference alternating voltage connected in the anode circuit of the tubes, said last-mentioned alternating voltage blocking the anode current of the two tubes during its negative half-cycles, means for applying the voltage under test across the grids of the tubes, rectifying means for rectifying the voltage applied to the grids, and a direct current indicator connected between the anodes, whereby change of amplitude and phase of the voltage between the anodes will be indicated by the meter.

2. An indicating system for indicating the amplitude of an alternating voltage under test and its phase displacement relative to a reference voltage of the same frequency, said system comprising a pair of vacuum tubes each having a cathode, a control electrode, and an anode, arranged in bridge relation with the cathodes connected together, means for connecting respective terminals of the voltage under test to the two control electrodes, a lead containing an impedance element connected between the mid-point of the voltage under test and the cathodes, so that the voltage under test is applied to said control electrodes in equal amplitude but in opposite phase, a half-wave rectifier connected in series with the reference voltage and the rectified reference voltage being connected across the impedance element, thereby applying said rectified voltage simultaneously to said control electrodes, the magnitude of the rectified voltage driving both control electrodes simultaneously negative and beyond cut-off during the half-cycles of the rectified voltage, so that anode current flows in the two tubes only during the no-cut-off intervals between the half-cycles of the rectified voltage, thereby producing a square wave in the anode circuits, said square wave being modified by the action of the test voltage on the control electrodes, means for shifting the phase of the reference voltage, a source of direct current voltage connected to the anodes of the tubes, and a direct current meter connected between the anodes, whereby the indication of the meter has an amplitude and a direction depending on the amplitude of the test voltage and its phase displacement from the reference voltage.

3. Means for indicating the amplitude of an alternating voltage and its phase displacement from the phase of a reference alternating voltage of the same frequency, said means comprising a pair of vacuum tubes each having an anode, a cathode and a control electrode, said tubes being connected in bridge relation to each other, circuit connections connecting one of the voltages between the cathodes and each of the control electrodes, circuit connections connecting the other of the voltages between the cathodes and an electrode of each tube, one of the voltages being subjected to half-wave rectification so that the voltage which it applies is a half-wave rectified voltage the control electrode voltage-anode current characteristics of the two tubes being substantially straight over the range of the first-mentioned voltage applied to the control electrodes, whereby uni-directional voltage is developed in the anode-cathode circuit dependent upon the amplitude of the first-mentioned alternating voltage and the relative phase displacement of the two alternating voltages, and a direct current indicating means bridged between the tubes for indicating the uni-directional voltage.

4. Means according to claim 3 in which the direct current indicating means is connected between the cathodes of the tubes.

5. An indicating system for giving an indication of the phase displacement and amplitude of an alternating voltage under test, said system comprising a pair of vacuum tubes connected in bridge relation, each tube having a cathode, a control grid and an anode, means for applying direct current anode voltage to the two anodes, means for impressing the voltage under test to the control grids of the two tubes so that the voltage under test is applied to said control grids in equal amplitude but in opposite phase, means for impressing a reference alternating voltage of the same frequency as the first mentioned alternating voltage in the grid circuits of the two tubes so that it is applied simultaneously to said control electrodes, means for rectifying the reference alternating voltage with half-wave rectification before its application to said grids, the magnitude of the half-wave rectified output voltage driving both control grids simultaneously negative and beyond cut-off during the half-cycles of the rectified voltage, so that anode current flows in the two tubes only during the no-cut-off intervals between the half-cycles of the rectified voltage, thereby producing a square wave in the anode circuits, said square wave being modified by the action of the test voltage on the control grids, and a direct current indicator bridged between the tubes and across at least part of the anode-cathode circuits of the tubes, whereby change of amplitude and phase of the test voltage relative to that of the reference voltage will be indicated on the direct current indicator.

6. Means for indicating the amplitude of an alternating voltage and its phase displacement from the phase of a reference alternating voltage of the same frequency, said means comprising a pair of vacuum tubes each having an anode, a cathode and a control electrode, said tubes being connected in bridged relation to each other, means for applying one of the voltages to the control electrodes simultaneously, means for applying the other of the voltages to another electrode of each tube, rectifying means for applying half-wave rectification to one of said voltages before its application between its corresponding electrodes so that the voltage which it applies is a half-wave rectified voltage applied simultaneously to its respective electrodes, thereby developing uni-directional pulses of half cycle duration and spaced by a half cycle duration, the anode current of the two tubes being simultaneously blocked during alternating half-cycle periods so that a square wave is produced in the anode circuits, the control electrode voltage-anode current characteristics of the two tubes being substantially straight, whereby a uni-directional voltage is developed in the anode-cathode circuit dependent upon the amplitude of the voltages and their respective phase displacement, and a direct current indicator bridged between the tubes for indicating the uni-directional voltage.

7. An indicating system for giving an indication of the phase displacement and amplitude of an alternating voltage under test, said system comprising a pair of non-rectifying vacuum tubes connected in bridge relation, each tube having a cathode, a control grid and an anode, with the cathodes connected together, means for supplying anode voltage to the two anodes, and a direct current indicator connected across the anodes, a reference alternating voltage of the same frequency as the first-mentioned voltage, a rectifier connected with the reference voltage to rectify it, connections connecting the rectifier output to both of the control grids whereby the half-wave rectified output is connected to both grids simultaneously, the magnitude of the half-wave rectified output voltage driving both grids simultaneously negative and beyond cut-off during the half-cycles of the rectified voltage, so that anode current flows simultaneously in the two tubes during the alternate half-cycles when there is no cut-off, connections connecting the test alternating voltage to the grids of the two tubes so that said test voltage is applied to the two grids at every instant with equal amplitude but in opposite phase, the grid voltage-anode current characteristics of the two tubes being substantially straight over the range of the test voltage applied to the grids, whereby change of amplitude and phase of the test voltage relative to that of the reference voltage will be indicated on the direct current meter.

8. Means for indicating the amplitude of an alternating voltage and its phase displacement from the phase of a reference alternating voltage of the same frequency, said means comprising a pair of vacuum tubes each having an anode, a cathode and control electrode, said tubes being connected in bridge relation with each other, circuit connections connecting one of the voltages between the cathodes and each of the control electrodes, circuit connections connecting the other of the voltages between the cathodes and an electrode of each tube, a half-wave rectifying means connected to rectify one of said voltages by half-wave rectification before its said connection to its respective electrodes, the other of said voltages being unrectified, the control electrode-anode current characteristics of the two tubes being substantially straight over the range of the first-mentioned alternating voltage applied to said control electrodes, whereby anode current flows through the two tubes in dependence on the phase relation and amplitude of the two alternating voltages, and a unidirectional voltage is thereby developed between the anodes dependent on the amplitude of the alternating voltages and their relative phase displacements, and a direct current indicator connected between the anodes for indicating the unidirectional voltage.

9. Means for indicating the amplitude of an alternating voltage and its phase displacement from the phase of a reference alternating voltage of the same frequency, said means comprising a pair of vacuum tubes each having an anode, cathode and control electrode, said tubes being connected in bridge relation with each other, the voltage under test being rectified by two half-wave rectifications occurring respectively during alternate half-cycles of the test voltage, and the voltage thus rectified being applied to the two control electrodes so that pulses of the rectified voltage are applied to the two control electrodes alternately, the reference alternating voltage being applied to the two anodes so that successive half-cycles are applied to said anodes simultaneously, the magnitude of the reference voltage producing anode current stoppage in the two tubes simultaneously during the negative half-cycles of the reference voltage, whereby a unidirectional voltage is developed between said anodes which is modified by the rectified test voltage applied to the control electrodes, and a direct current indicator connected between said anodes for indicating the modified unidirectional voltage.

10. An indicating system for indicating the amplitude of an alternating voltage under test and also its phase displacement from the phase of a reference alternating voltage of the same frequency, said system comprising a pair of non-rectifying vacuum tubes connected in bridge relation, each tube having a cathode, control electrode and anode, the voltage under test being connected to the two control electrodes, the midpoint of the voltage under test being connected by a lead to the cathodes, so that the voltage under test is applied to said control electrodes in equal amplitude but in opposite phase, a half-wave rectifier connected to rectify the reference voltage, the rectified reference voltage being applied in said cathode lead so that it is applied simultaneously to said control electrodes, whereby the rectified reference voltage simultaneously drives the control electrodes intermittently negative with respect to their normal bias, the magnitude of the half-wave rectified voltage driving both control electrodes simultaneously negative and beyond cut-off during the half-cycles of the rectified voltage, and the voltage under test drives the control electrodes alternating positive and negative relative to their normal bias, the control electrode voltage-anode current characteristics of the two tubes being substantially straight over the range of the test voltage applied to the control electrodes, and a direct current meter connected between the anodes whereby a unidirectional component is indicated on the meter in dependence both upon the amplitude and phase displacement of the voltage under test.

EDGAR T. HOWES.

REFERENCES CITED

The following references are of record in the file of this patent:

UNITED STATES PATENTS

| Number | Name | Date |
|---|---|---|
| 1,856,707 | Horton | May 3, 1932 |
| 2,093,512 | Bowen | Sept. 21, 1937 |
| 2,217,477 | Gulliksen | Oct. 8, 1940 |
| 2,225,348 | Mikelson | Dec. 17, 1940 |
| 2,281,995 | Purington | May 5, 1942 |
| 2,335,265 | Dodington | Nov. 30, 1943 |
| 2,411,916 | Woodyard | Dec. 3, 1946 |